United States Patent
Perssonet al.

(10) Patent No.: US 12,024,021 B2
(45) Date of Patent: Jul. 2, 2024

(54) MOTOR VEHICLE WITH AN ICE/BEV COMBINED SCALABLE PLATFORM

(71) Applicant: Volvo Car Corporation, Gothenburg (SE)

(72) Inventors: Klas Persson, Kungälv (SE); Martin Kristensson, Stora Höga (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/529,348

(22) Filed: Nov. 18, 2021

(65) Prior Publication Data
US 2022/0194205 A1 Jun. 23, 2022

(30) Foreign Application Priority Data
Dec. 17, 2020 (EP) .................................... 20215072

(51) Int. Cl.
*B60K 6/40* (2007.10)
*B60K 1/04* (2019.01)
(Continued)

(52) U.S. Cl.
CPC .................. *B60K 6/40* (2013.01); *B60K 1/04* (2013.01); *B60K 6/28* (2013.01); *B60L 58/26* (2019.02);
(Continued)

(58) Field of Classification Search
CPC ... B60K 6/40; B60K 1/04; B60K 6/28; B60K 2001/0438; B60K 11/02; B62D 21/17;
(Continued)

(56) References Cited

U.S. PATENT DOCUMENTS 4,339,015 A * 7/1982 Fowkes .................. B60L 50/62
180/68.5
5,501,289 A * 3/1996 Nishikawa ............... B60K 1/04
280/783
(Continued)

FOREIGN PATENT DOCUMENTS

CN 109768199 A * 5/2019
CN 111746649 A * 10/2020 ............... B60K 1/04
(Continued)

OTHER PUBLICATIONS

Jiang, Battery Pack Box Body Integrated With Liquid Cooling System And Electric Vehicle, Nov. 13, 2020, EPO, CN 111933846 A, Machine Translation of Description (Year: 2020).*
(Continued)

*Primary Examiner* — Amy R Weisberg
*Assistant Examiner* — Matthew D Lee
(74) *Attorney, Agent, or Firm* — Clements Bernard Walker; Christopher L. Bernard; Devin Cummins

(57) ABSTRACT

A motor vehicle with a scalable frame that may be used with an internal combustion engine or with an electric drive. The vehicle has at least four wheels and a frame with a central support bounded by a front transverse section, a rear transverse section and two longitudinal side profiles. The front and rear transverse sections are formed of cast metal with mechanical connector parts attached respectively to a front frame structure and a rear frame structure. The front transverse section includes cooling duct connector parts adapted to be connected to cooling fluid ducts and electrical connector parts adapted to be connected to conductors of an electric motor, the rear transverse section including electrical connector parts adapted to be connected to an electrical connector, such as a charging terminal.

9 Claims, 6 Drawing Sheets

(51) Int. Cl.
  *B60K 6/28* (2007.10)
  *B60L 58/26* (2019.01)
  *B62D 21/17* (2006.01)
(52) U.S. Cl.
  CPC ...... *B62D 21/17* (2013.01); *B60K 2001/0438* (2013.01)
(58) Field of Classification Search
  CPC ........ B62D 21/03; B62D 21/12; B62D 21/10; B62D 63/025; B60L 58/26
  See application file for complete search history.

(56) References Cited

U.S. PATENT DOCUMENTS

| | | | | |
|---|---|---|---|---|
| 2012/0161429 | A1* | 6/2012 | Rawlinson | B62D 25/025 280/801.1 |
| 2013/0119757 | A1* | 5/2013 | Tachikawa | B60L 3/0015 307/9.1 |
| 2014/0072835 | A1* | 3/2014 | Tsujimura | H01M 10/6562 429/7 |
| 2017/0005371 | A1* | 1/2017 | Chidester | H01M 50/20 |
| 2017/0005380 | A1* | 1/2017 | Harris | F28D 15/02 |
| 2017/0120951 | A1* | 5/2017 | Ashraf | B62D 21/07 |
| 2018/0097265 | A1* | 4/2018 | Tarlau | H01M 10/613 |
| 2019/0393571 | A1* | 12/2019 | Weicker | H01M 50/505 |
| 2020/0070639 | A1* | 3/2020 | Bohmer | B60K 1/04 |
| 2020/0189665 | A1* | 6/2020 | Friedman | B62D 29/041 |
| 2020/0220125 | A1* | 7/2020 | Caliskan | H01M 50/249 |
| 2020/0369140 | A1* | 11/2020 | McCarron | B60G 15/067 |
| 2020/0406735 | A1* | 12/2020 | Nagaya | B62D 21/09 |
| 2021/0101641 | A1* | 4/2021 | Kim | B62D 27/023 |
| 2021/0348630 | A1* | 11/2021 | Bachu | F16B 2/22 |
| 2022/0073149 | A1* | 3/2022 | Thomas | B62D 25/2009 |
| 2022/0219523 | A1* | 7/2022 | Shin | B60K 11/02 |
| 2022/0320662 | A1* | 10/2022 | Oishi | H01M 50/249 |
| 2022/0348275 | A1* | 11/2022 | Harmon | B62D 27/06 |
| 2022/0355636 | A1* | 11/2022 | Harmon | B62D 63/025 |

FOREIGN PATENT DOCUMENTS

| | | | | |
|---|---|---|---|---|
| CN | 111933846 | A | * 11/2020 | |
| DE | 102018206600 | A1 | * 10/2019 | |
| DE | 2018113812 | A1 | 12/2019 | |
| DE | 102018113812 | A1 | * 12/2019 | |
| EP | 3936415 | A1 | * 1/2022 | .......... B62D 25/082 |
| FR | 2972169 | A1 | 9/2012 | |
| WO | WO-2014034377 | A1 | * 3/2014 | .............. B60K 1/00 |

OTHER PUBLICATIONS

Gu, The Battery Shell Manufacturing Method Of Shell, May 17, 2020, EPO, CN 109768199 A, Machine Translation of Description (Year: 2020).*

Bohlien, Method For Producing A Body Structure Of A Motor Vehicle, Dec. 12, 2019, EPO, DE 102018113812 A1, Machine Translation of Description (Year: 2019).*

Jun. 2, 2021 International Search Report issued in International Application No. 20215072.

* cited by examiner

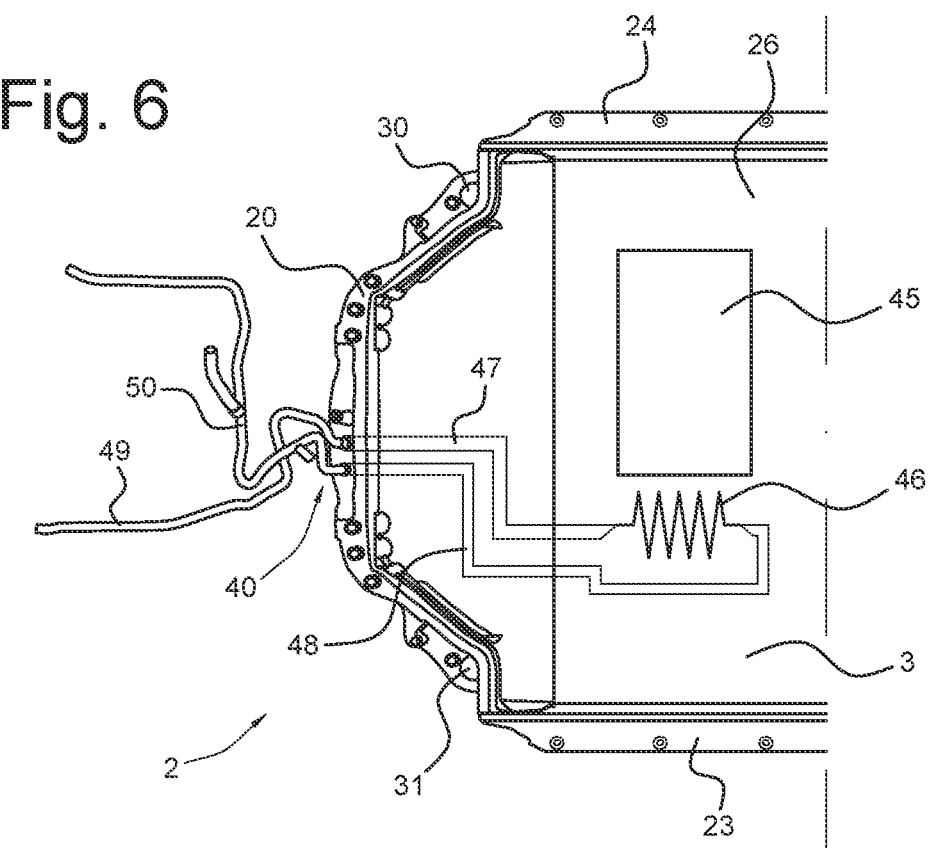
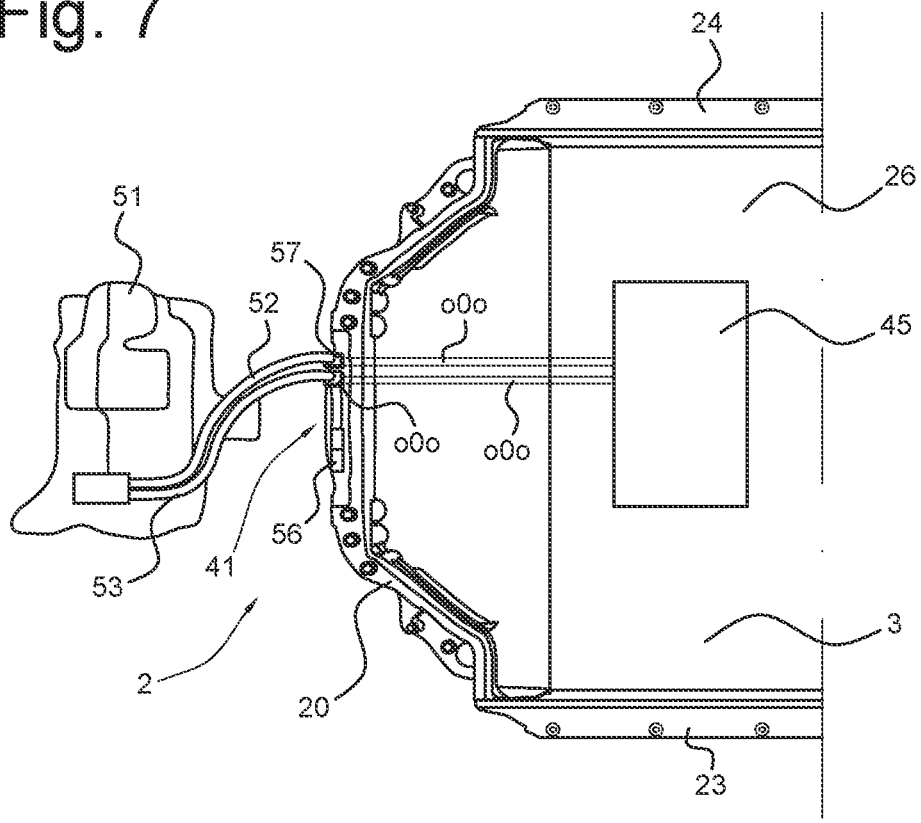

MOTOR VEHICLE WITH AN ICE/BEV COMBINED SCALABLE PLATFORM

CROSS-REFERENCE TO RELATED APPLICATION

The present disclosure claims the benefit of priority of co-pending European Patent Application No. 20215072.8, filed on Dec. 17, 2020, and entitled "MOTOR VEHICLE WITH AN ICE/BEV COMBINED SCALABLE PLATFORM," the contents of which are incorporated in full by reference herein.

TECHNICAL FIELD

The disclosure relates to a motor vehicle including a frame with a central support bounded by a front transverse section, a rear transverse section and two longitudinal side profiles, wherein the front and rear transverse sections each include a cast metal part.

The disclosure also relates to a frame adapted be used with either of an electric motor and with an internal combustion engine and to a method for constructing a motor vehicle including such a frame.

BACKGROUND

It is known to provide battery-powered electric vehicles with a central battery casing that is at the front and rear end connected to a sub frame carrying the suspension, the wheels and the electric motor. Different dimensions of the wheelbase are realized by matching the length of the profile parts forming the rectangular battery casing.

It is also known to form tubular battery casings of extruded aluminum, with the end faces of the casing being covered by die-cast aluminum cover plates.

SUMMARY

It is an object of the present disclosure to provide a motor vehicle with a frame having a central support that forms a platform for use with either internal combustion engines (ICEs) or for battery powered electric vehicles (BEVs) having different lengths and using battery packs of varying size. It is a further object of the disclosure to provide a motor vehicle having a central support with a relatively large stiffness and providing a high level of impact protection.

Herein a motor vehicle in accordance with the disclosure is characterized in that the front and rear transverse sections each extend in one piece along the width of the central support, the front and rear transverse sections including on each transverse side mechanical connector parts attached respectively to a front and rear frame structure, the front transverse section including cooling duct connector parts adapted to be connected to cooling liquid ducts and electrical connector parts adapted to be connected to conductors of an electric motor, the rear transverse section including electrical connector parts adapted to be connected to an electrical connector, such as a charging terminal.

The cast front and rear sections are formed with the connector parts for the electrical and cooling interfaces for electric vehicles and with the mechanical connector parts indirectly coupling the frame to the front and rear sub frames that may support either a combustion engine or an electric drive and provide a large degree of stiffness. In combination with an electric drive, the length of the longitudinal side profiles can be varied to allow scalability of different vehicle sizes and allows a large size battery to be accommodated while providing strong crash load paths.

In case the frame is used in combination with an electric drive, the cooling ducts for cooling of the battery and the electrical connectors for connecting the battery to the motor and for charging of the battery, are attached to the respective connector parts on the frame. In case the frame is used in combination with an internal combustion engine, no cooling ducts or electrical connectors are connected with the connector parts of the frame.

The front and rear transverse sections may be formed by die casting, for instance of aluminum. The longitudinal parts may be formed by extrusion. This allows the complex connector parts of the mechanical, electrical and fluid interfaces to be formed in the casting operation of the transverse sections, while the length dimension is determined by the length of the extruded longitudinal parts.

The mechanical connector parts connecting the frame to the front and rear sub frames may include form-fitting shapes, ridges, recesses, alignment bores and pins, reinforcements, threaded bores and/or through holes in the cast transverse sections in which bolts are received.

The cooling duct connector parts of the front transverse section for accommodating and fixing of the cooling interfaces, may include form-fitting shapes, ridges, recesses, cast ducts, threaded bores, tubular sections and the like.

The electrical connector parts of the front and rear transverse sections may include recesses, ridges, threaded parts and reinforcements for accommodating and attaching electrical connectors and conductors to the cast transverse sections.

An embodiment of a vehicle according to the disclosure includes bottom plate segments extending between the longitudinal side profiles and connected to the side profiles via welding. The bottom plates may be part of a battery housing including a heat exchange member that is in fluid communication with the cooling duct parts on the front transverse section, the battery being conductively connected to the electrical connector parts of the front and rear transverse sections.

A method of constructing an electric vehicle according to the disclosure includes the steps of:

providing a cast metal front transverse section, a cast metal rear transverse section and two longitudinal side profiles of predetermined length, the front and rear transverse sections including at each transverse side mechanical connector parts for attaching respectively to a front and rear sub frame structure, the front transverse section including cooling duct connector parts adapted to be connected to cooling fluid ducts and electrical connector parts adapted to be connected to an electric motor, the rear transverse section including an electrical connector part adapted to be connected to a charging terminal, connecting the side profiles, extending in a mutually parallel orientation, by connection of their ends to the front transverse section and rear transverse section, defining a central frame part, connecting bottom plates extending transversely to the side profiles, across the width of the central frame part, the bottom plates extending from the front transverse section to the rear transverse section, connecting a front sub frame and a rear sub frame to the mechanical connector parts of the front and rear transverse sections by engaging coupling members on the sub frames with the mechanical connector parts on the transverse sections, placing a battery casing at the central frame part, having a heat exchange device, placing ducts of the heat exchange device in fluid communication with cooling ducts on the front sub frame at the cooling duct connector parts of the front transverse section, connecting the electrical connector part of the front transverse section to an electrical connector of an electric motor and to a battery terminal, and connecting the electrical connector part of the rear transverse section to a battery terminal and to an electrical connector, such as a charging terminal.

When constructing a vehicle with an internal combustion engine, the combustion engine is supported by the front sub frame without a battery casing or cooling and electrical interfaces being formed.

In both cases the length of the frame can be easily varied by predetermining the length of the longitudinal side profiles.

BRIEF DESCRIPTION OF THE DRAWINGS

A number of embodiments of a vehicle according to the disclosure will be explained in detail with reference to the exemplary drawings. In the drawings:

FIG. 6 shows the fluid duct connector parts of the front transverse section of the frame, FIG. 7 shows the electrical connector parts of the front transverse section of the frame.

DESCRIPTION OF EMBODIMENTS

Figure 1:
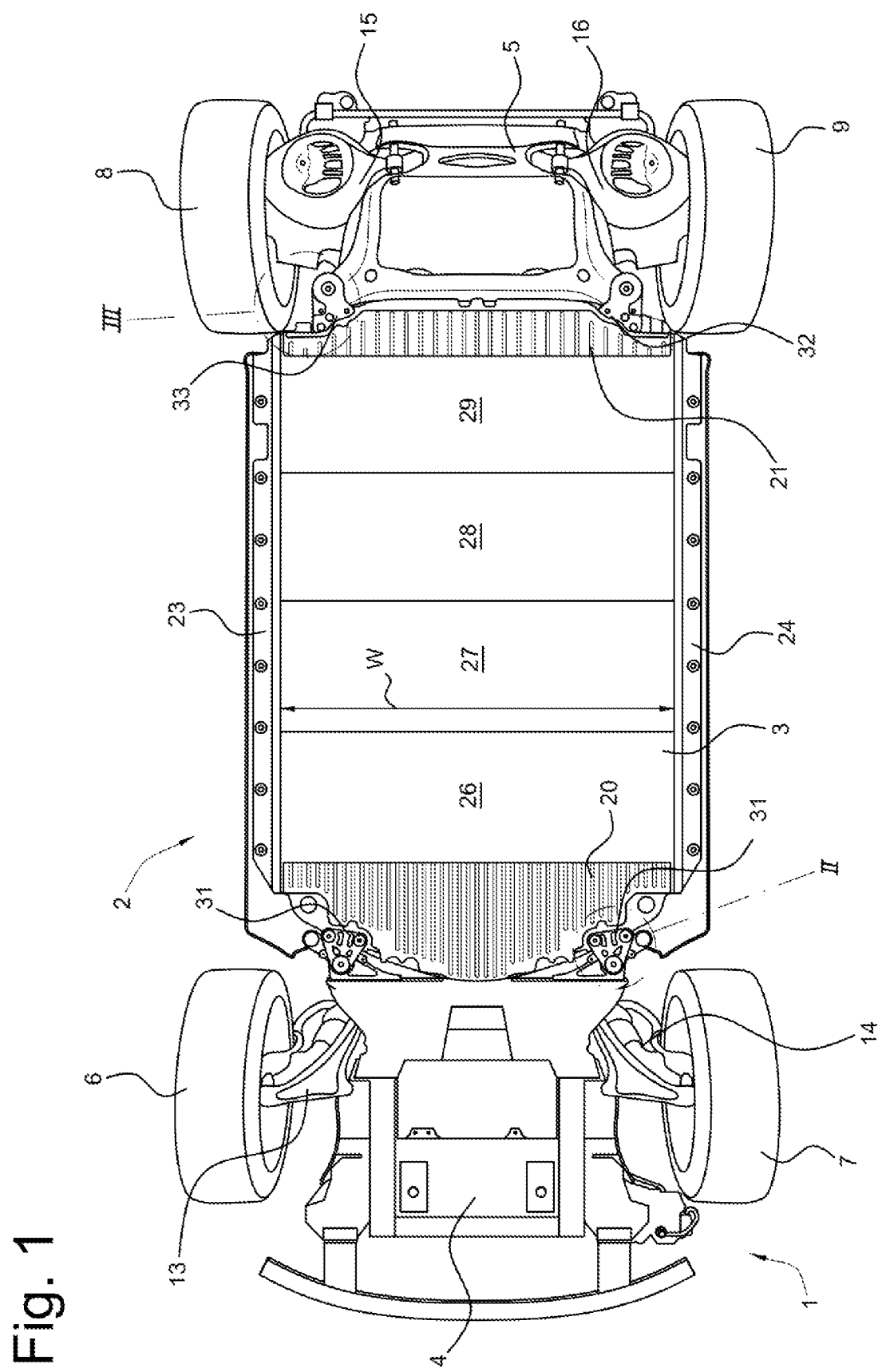
FIG. 1 shows a bottom view of a battery powered electric vehicle including a frame according to the disclosure.

FIG. 1 shows a bottom view of a battery powered electric vehicle 1, including a frame 2 with a central support 3 that is connected to a front sub frame 4 and to a rear sub frame 5. Front wheels 6,7 and rear wheels 8,9 are attached to the sub frames 4,5 via suspensions 13,14,15,16.

The frame 2 includes a front transverse section 20 and a rear transverse section 21 that are formed of die cast aluminum and that extend in a single piece across the width W of the frame 2. The sections 20, 21 are interconnected by longitudinal side profiles 23, 24 that are formed of extruded aluminum. Bottom plates 26,27,28,29 are connected to the side profiles 23,24 and to front and rear sections 20,21 by FSW welding, forming a water-tight bottom.

The front and rear sections 20,21 are connected to the front and rear sub frames 4,5 via mechanical connector parts 30,31,32,33 including accommodating projections and recesses and bolts that extend through holes in the front and rear sections 20,21.

Figure 2:
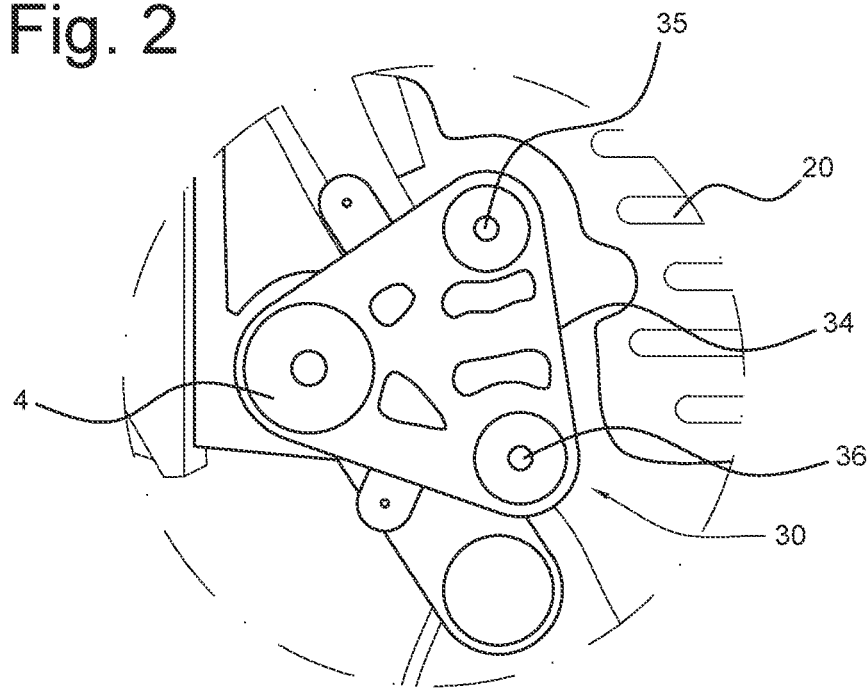
FIG. 2 shows the mechanical connector parts connecting the frame to a rear sub frame of an electric vehicle, on an enlarged scale.
Figure 3:
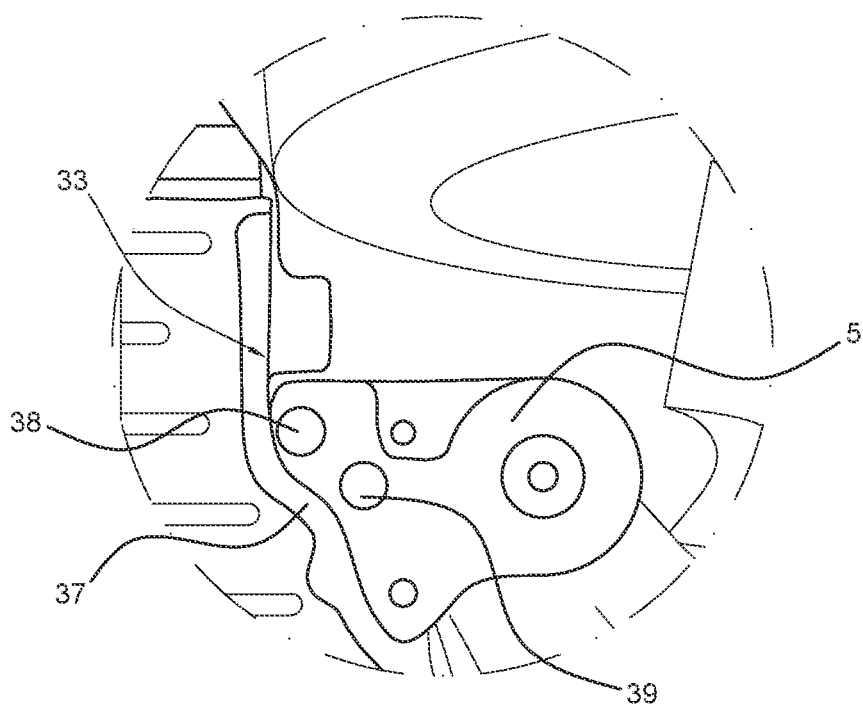
FIG. 3 shows the mechanical connector parts connecting the frame to a front sub frame of an electric vehicle on an enlarged scale.

FIGS. 2 and 3 show the mechanical connector parts 30, 33 on an enlarged scale. The connector parts 30 of the front section 20 include a recess with a shaped edge 34 receiving the matching front sub frame 4 and holes 35, 36 for receiving connecting bolts. As shown in FIG. 3, the connector parts 33 of the rear frame section 21 include a shaped edge 37 that engages with the matching rear sub frame 5 in a form fitting manner, and holes 38,39 for receiving connecting bolts.

Figure 4:
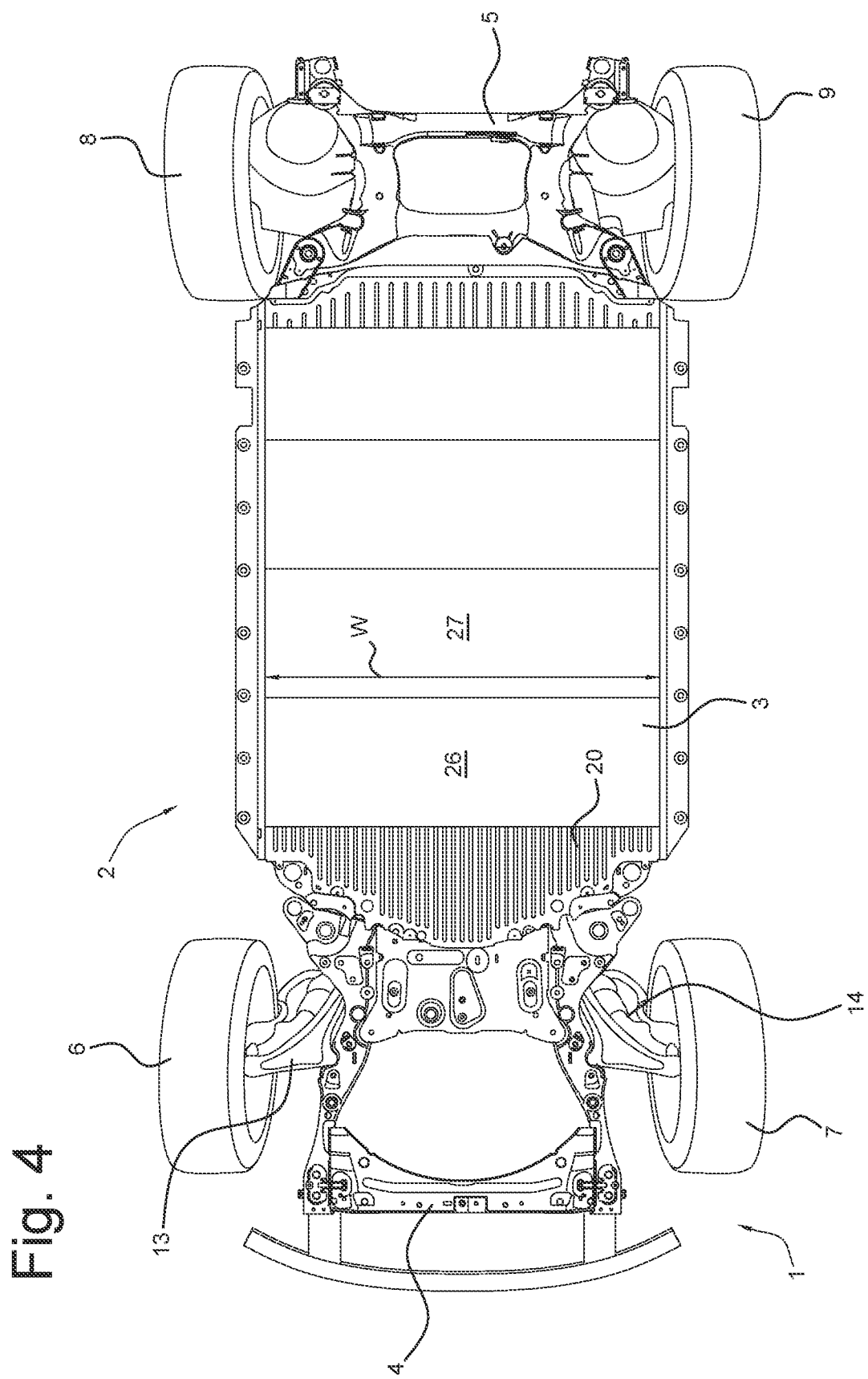
FIG. 4 shows a bottom view of a vehicle including an internal combustion engine and a frame according to the disclosure.

FIG. 4 shows a bottom view of a frame for a vehicle 1 with an internal combustion engine including the frame 2 with a central support 3 that is connected to a front sub frame 4 and to a rear sub frame 5.

Figure 5:
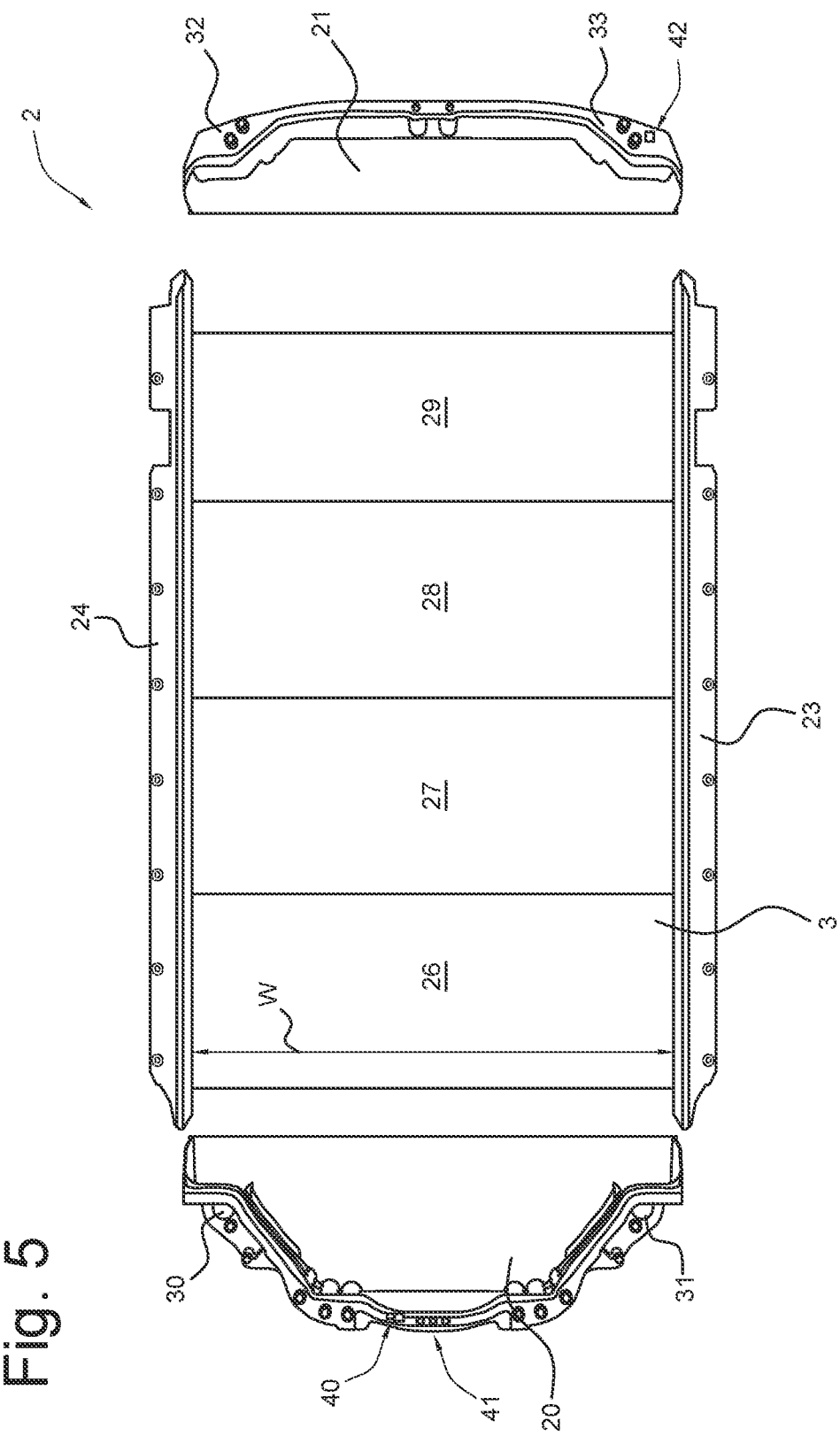
FIG. 5 shows a top view of a frame according to the disclosure.

FIG. 5 shows a top view of the frame 2 with the bottom plates 26-29 that are mutually interconnected and connected to the extruded side profiles 23, 24 through water-tight FSW welding and additional CMT welds, for forming a bottom side of the vehicle. The extruded profiles 23, 24 are cut to the required length to handle the scalability of different vehicle sizes. The structural integration of the front and rear sub frames 4, 5 with the die cast transverse sections 20, 21 via the connector parts 30-33, including fixation via bolts, results in good Noise, Vibration and Harshness (NVH) properties and a good crash performance.

In case the frame 2 is used in combination with an electric drive, the central support 3 houses a battery casing and a battery pack. The cooling and electrical interfaces are provided in the die cast transverse sections 20, 21 that are provided with cooling duct connector parts 40 for receiving the cooling interfaces, and electrical connector parts 41, 42 for receiving the electrical interfaces.

FIG. 6 schematically shows an electric battery 45 being placed in a battery casing on the central support 3 of the frame 2. A heat exchanger 46 is provided at the battery casing for cooling of the battery 45. The ducts 47, 48 of the heat exchanger 46 are connected to fluid ducts 49, 50 via the connector parts 40 in the front frame section 20, which may include channels in the die cast frame section and/or coupling members interconnecting the ducts 47, 48 and ducts 49,50. In an embodiment the coupling members may include pre-formed ducts provided in the die cast parts 20 or threaded parts or other cooling duct couplers.

FIG. 7 shows an electric motor 51, supported on the front sub frame 4 (not shown in the figure), the motor 51 being connected to the battery 45 via electrical conductors 52, 53. The conductors 52, 53 are connected to terminals 54,55 of the battery 45 via connectors 57,58 that are fixed on electrical connector part 41 of the front frame section 20. The connector part 41 may receive multiple connectors 56-58 for supplying energy from the battery 45 to various electric devices on the vehicle.

Figure 8:
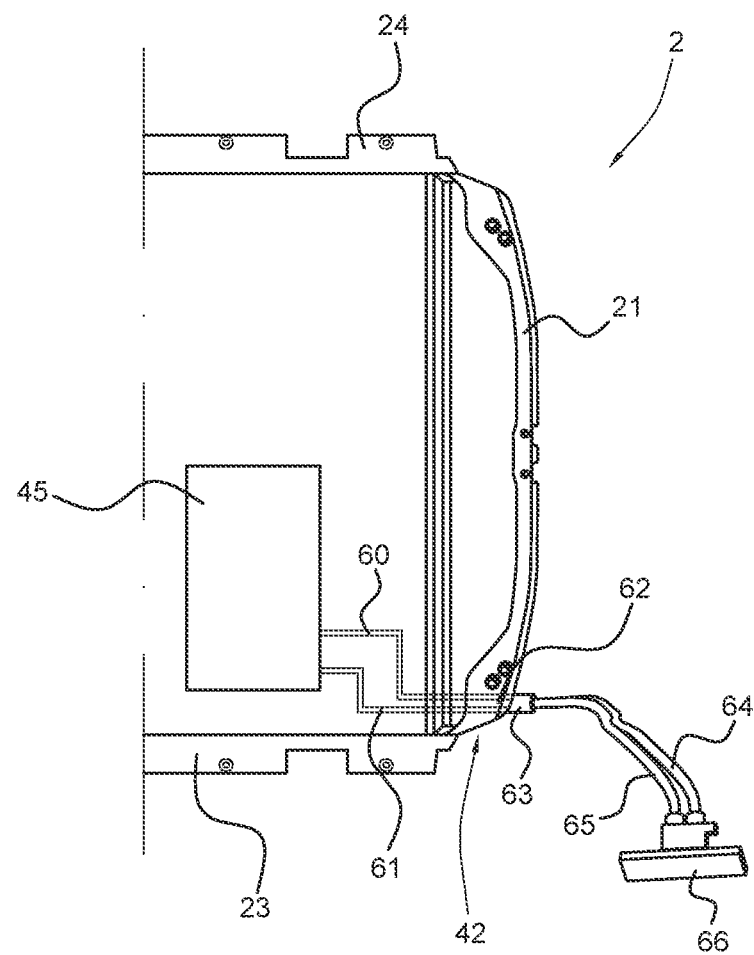
FIG. 8 shows the electrical connector parts of the rear transverse section of the frame.

FIG. 8 shows the rear section 21 of the frame 2 with the electrical connector part 62 of the die cast frame section 21 including a receiving space for accommodating an electrical connector 63 that attaches charging terminals 60,61 of the battery 45 to leads 64,65 of a charger 66.

The invention claimed is:

1. A motor vehicle comprising:
   a frame with a central support bounded by a front transverse section, a rear transverse section, and two longitudinal side profiles, and
   bottom plate segments extending between the longitudinal side profiles and connected to the side profiles and transverse sections by welding to form a water-tight bottom side of the motor vehicle,
   the front and rear transverse sections each comprising a cast metal part and the longitudinal side profiles being formed by extrusion and joined between the cast metal parts of the front and rear transverse sections, wherein the front and rear transverse sections each extend in one piece along the width (W) of the central support, the front and rear transverse sections comprising on each transverse side mechanical connector parts, the transverse sections attached respectively to a front frame structure and a rear frame structure, the front transverse section comprising cooling duct connector parts adapted to be connected to cooling fluid ducts and electrical connector parts adapted to be connected to conductors of an electric motor, the rear transverse section comprising electrical connector parts adapted to be connected to an electrical connector.

2. The motor vehicle according to claim 1, the mechanical connector parts comprising holes in the front and rear transverse sections, bolts extending through the holes.

3. The motor vehicle according to claim 1, comprising a combustion engine, the electrical connector parts and the cooling duct connector parts of the front and rear transverse sections not being attached to electrical conductors or cooling fluid ducts.

4. The motor vehicle according to claim 1, comprising an electric motor, the electrical connector parts and the cooling duct connector parts of the front and rear transverse sections being attached to electric conductors and fluid ducts respectively.

5. The motor vehicle according to claim 4, the central support comprising a battery housing being provided with a heat exchange member that is in fluid communication with the cooling duct connector parts on the front transverse section, a battery being conductively connected to the electrical connector parts of the front and rear transverse sections.

6. A frame for a motor vehicle adapted to be used with either an electric motor or with an internal combustion engine, comprising:
  a central support bounded by a front transverse section, a rear transverse section and two longitudinal side profiles, and
  bottom plate segments extending between the longitudinal side profiles and connected to the side profiles and transverse sections by welding to form a water-tight bottom side of the motor vehicle,
  wherein the front and rear transverse sections each comprise a cast metal part and the longitudinal side profiles being formed by extrusion and joined between the cast metal parts of the front and rear transverse sections, wherein the front and rear transverse sections each extend in one piece along the width (W) of the central support, the front and rear transverse sections comprising at each transverse side mechanical connector parts for attaching respectively to a front sub frame structure and rear sub frame structure, the front transverse section comprising cooling duct connector parts adapted to be connected to cooling fluid ducts and electrical connector parts adapted to be connected to conductors of an electric motor, the rear transverse section comprising electrical connector parts adapted to be connected to an electrical connector.

7. The frame according to claim 6, the mechanical connector parts comprising holes in the transverse parts.

8. A method of constructing an electric vehicle, comprising:
  providing a cast metal front transverse section, a cast metal rear transverse section and two longitudinal side profiles of predetermined length, the longitudinal side profiles being formed by extrusion, the front and rear transverse sections comprising at each transverse side mechanical connector parts for attaching respectively to a front sub frame structure and rear sub frame structure, the front transverse section comprising cooling duct connector parts adapted to be connected to cooling fluid ducts and electrical connector parts adapted to be connected to conductors of an electric motor, the rear transverse section comprising electrical connector parts adapted to be connected to a conductor,
  connecting the side profiles, extending in a mutually parallel orientation, by connection of their ends to the front transverse section and rear transverse section, defining a central frame part comprising the connected cast metal front transverse section, cast metal rear transverse section and two extruded longitudinal side profiles,
  connecting bottom plates extending transversely to the side profiles, across the width (W) of the central frame part, the bottom plates extending from the front transverse section to the rear transverse section and connected to the side profiles and transverse sections by welding to form a water-tight bottom side of the electric vehicle,
  connecting a front sub frame and a rear sub frame to the mechanical connector parts of the front and rear transverse sections by engaging coupling members on the sub frames with the mechanical connector parts on the transverse sections,
  placing a battery casing at the central frame part, having a heat exchange device,
  placing ducts of the heat exchange device in fluid communication with cooling ducts on the front sub frame via the cooling duct connector parts of the front transverse section,
  connecting the electrical connector parts of the front transverse section to an electrical connector of an electric motor and to a battery terminal, and
  connecting the electrical connector part of the rear transverse section to a battery terminal and to a charging terminal.

9. A method of constructing a vehicle having an internal combustion engine, comprising:
  providing a cast metal front transverse section, a cast metal rear transverse section and two longitudinal side profiles of predetermined length, the longitudinal side profiles being formed by extrusion, the front and rear transverse sections comprising at each transverse side mechanical connector parts for attaching respectively to a front sub frame and rear sub frame, the front transverse section comprising cooling duct connector parts adapted to be connected to cooling fluid ducts and electrical connector parts adapted to be connected to conductors of an electric motor, the rear transverse section comprising an electrical connector part adapted to be connected to a conductor,
  connecting the side profiles, extending in a mutually parallel orientation, by connection of their ends to the front transverse section and rear transverse section, defining a central frame part comprising the connected cast metal front transverse section, cast metal rear transverse section and two extruded longitudinal side profiles,
  connecting bottom plates extending transversely to the side profiles, across the width (W) of the central frame part, the bottom plates extending from the front transverse section to the rear transverse section and connected to the side profiles and transverse sections by welding to form a water-tight bottom side of the vehicle, connecting a front sub frame and a rear sub frame to the mechanical connector parts of the front and rear transverse sections, and placing a combustion engine on the front sub frame.

\* \* \* \* \*